Dec. 17, 1968     R. H. WIGHT     3,416,423
OPTICAL SYSTEM FOR PANORAMIC CAMERAS
Filed July 11, 1966
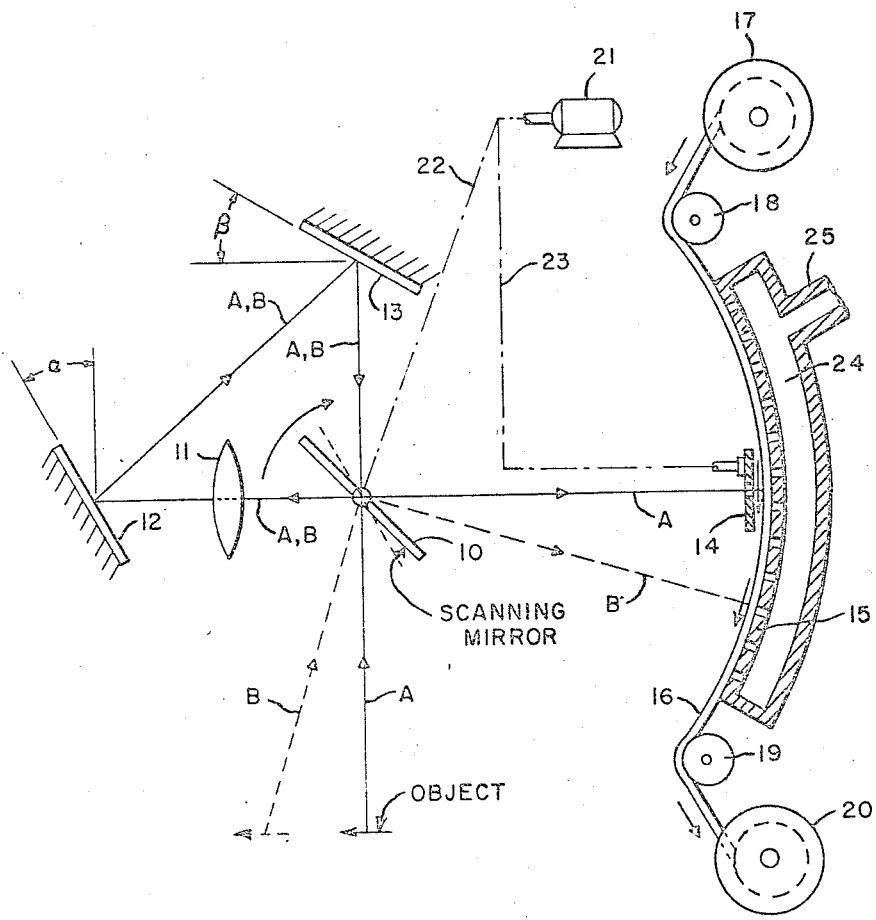

United States Patent Office 3,416,423
Patented Dec. 17, 1968

3,416,423
OPTICAL SYSTEM FOR PANORAMIC CAMERAS
Ralph H. Wight, Portuguese Bend, Calif., assignor to Fairchild Camera and Instrument Corporation, a corporation of Delaware
Filed July 11, 1966, Ser. No. 564,378
6 Claims. (Cl. 95—16)

This invention relates to an optical system for panoramic cameras and particularly to such cameras in which the film is stationary during the exposure period.

Heretofore, optical systems for panoramic cameras have been of two principal types. In the first type, the objective lens is stationary and scanning is effected by means of a scanning mirror accurately synchronized with a moving film. Such accurate synchronization involves complex and costly synchronizing mechanism for driving the film transport.

The second prior type of optical system for panoramic cameras has involved the use of a film which is stationary during the exposure period together with an optical system including one or more rotatable lenses or prisms. Such a rotatable lens system, together with its supporting structure, has considerable mass and requires a considerable amount of driving power, particularly if it is of the oscillating type, requiring alternate acceleration and deceleration. Moreover, at typical speeds of rotation of such a lens system, provisions must be made for minimizing vibration due to dynamic unbalance, which becomes difficult and expensive.

It is an object of the invention therefore to provide a new and improved optical system for panoramic cameras which obviates one or more of the above disadvantages of prior optical systems of this type.

It is another object of the invention to provide a new and improved optical system for panoramic cameras in which the moving parts have a minimum mass and, therefore, require a minimum driving power and can be readily dynamically balanced.

In accordance with the invention, there is provided an optical system for a panoramic camera comprising a continuously rotatable means having at least two planar reflective surfaces parallel to its axis of rotation, optical means effective to direct an image element upon one surface of the rotatable means substantially at its axis of rotation and thence upon another surface thereof also substantially at its axis of rotation, and an arcuate film-supporting platen having a radius of curvature substantially equal to the equivalent focal length of the optical means and disposed with its center of curvature at the axis of rotation of the rotatable means. The term "rotatable" is used herein and in the appended claims to refer to either rotation continuously in the same direction or oscillatory rotation.

For a better understanding of the present invention, together with other and further objects thereof, reference is had to the following description, taken in connection with the accompanying drawing, while its scope will be pointed out in the appended claims.

The single figure of the drawing is a schematic representation of an optical system for a panoramic camera embodying the present invention.

Referring now more specifically to the drawing, there is represented an optical system for a panoramic camera comprising a continuously rotatable member having at least two planar reflective surfaces parallel to its axis of rotation. Specifically, this member may be in the form of a substantially planar member 10 in the form of a plate with mirror surfaces on both sides and preferably of a thickness which is only a few percent of its maximum lateral dimension. The two-sided mirror 10 is rotated continuously by a motor 21 through a mechanism represented schematically at 22. Alternatively, the second mirror surface may be formed on a second member coaxial with member 10 and rotatable synchronously therewith.

The system further comprises optical means effective to direct and focus an image element upon one surface of the member 10 substantially at its axis of rotation and thence upon another surface thereof also substantially at its axis of rotation. As indicated in the drawing, an object is imaged on the lower mirror surface of the member 10 and is reflected thereby and translated by an optical system including, in the order named, an objective lens 11, a stationary mirror 12, a stationary mirror 13, the reverse mirror surface of the member 10, and a slit plate 14 adjacent a curved film platen 15. A film 16 is transported past the platen 15 by any well known form of film transport, shown schematically as a supply reel 17, idler rollers 18 and 19, and a takeup reel 20. The film transport may, for example, be of the type described in Patent 3,160,082 to Lysle. In order to cause the film 16 to conform to the curved configuration of the platen 15, it is of the conventional apertured vacuum type communicating with a vacuum chamber 24 having a vacuum inlet 25. The slit plate 14 is connected to be oscillated synchronously with rotation of the member 10 through a suitable driving connection from the motor 21 represented schematically at 23.

The path of a ray from an image element of the object is indicated by the solid line A corresponding to the mean position of the member 10. Upon rotation of the member 10 to the position indicated in dotted lines, the ray from an image element is represented by dotted line B. In order to cause a ray, such as ray A impinging on the member 10 substantially at its axis of rotation, to be redirected upon the back surface thereof also substantially at its axis of rotation, the mirror 12 is inclined to the vertical by the angle $\alpha$ while the mirror 13 is inclined to the horizontal by the angle $\beta$. The angles $\alpha$ and $\beta$ may vary within a substantial range but, in one preferred form, each of these angles is 22½° so that the angle between the mirrors 12 and 13 is 45°.

The lens 11 is disposed so that its rear nodal point is located substantially at the axis of rotation of the member 10. While the lens 11 is shown as a single lens for purposes of simplicity and illustration, it may actually be composed of a number of lens elements some of which may actually be positioned in front of, between, or beyond the fixed mirrors 12 and 13 in the optical path through the system. The platen 15 has a cylindrical surface disposed in the focal plane of the lens 11 with its center at the axis of rotation of the member 10. While, as pointed out, the slit plate 14 is oscillated synchronously with rotation of the member 10, that is, with the image motion produced by the mirror surfaces of the member 10, the degree of synchronization required between these two movements is of a lower order of magnitude than that required for synchronizing the scanning mirror and the film in a moving-film camera and is easily achievable.

It is believed that the operation of the optical system of the invention will be apparent from the foregoing description. In brief, it will be assumed that the object being photographed, for example the ground, is at a practically infinite distance from the camera. On this assumption, a bundle of light rays of a size dependent upon the field of the objective lens 11 and including rays such as the ray A is imaged on the lower mirror surface of the member 10 substantially at its axis of rotation, directed through the lens 11, and reflected by the mirrors 12 and 13 to the upper mirrored surface of the member 10, also substantially at its axis of rotation, and thence to the slit plate 14 and to the film 16. As the motor 21 continuously rotates the member 10 and oscillates the slit plate in synchronism, successive image elements expose successive line areas of the film 16 as the slit plate 14 moves from its uppermost to its lowermost position. During the reverse travel of the slit plate 14, the film transport 17 is advanced to dispose the next successive frame on the vacuum platen 15. In this way, successive fields of view are photographed, as in other panoramic cameras.

Since the film is stationary during the exposure portion of each cycle, no accurate synchronization of a movable film with the scanner is required. At the same time, the member 10 with mirrors on both surfaces may be made extremely light, requiring a minimum of power for operation and involving a minimum of dynamic unbalance.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An optical system for a panoramic camera comprising:
    a continuously rotatable means having at least two planar reflective surfaces parallel to its axis of rotation;
    optical means effective to direct an image element upon one surface of said rotatable means substantially at its axis of rotation and thence upon another surface thereof also substantially at its axis of rotation;
    and an arcuate film-supporting platen having a radius of curvature substantially equal to the equivalent focal length of said optical means and disposed with its center of curvature at the axis of rotation of said rotatable means.

2. An optical system in accordance with claim 1 in which said rotatable means is a substantially planar member with opposed mirror surfaces.

3. An optical system in accordance with claim 1 in which said optical means includes a stationary objective lens and a plurality of stationary mirrors.

4. An optical system in accordance with claim 1 in which said optical means is stationary and includes, in the order named, an objective lens and a pair of planar mirrors.

5. An optical system in accordance with claim 4 in which the angle between said planar mirrors is approximately 45°.

6. An optical system in accordance with claim 4 in which the objective lens is positioned with its rear nodal point substantially at the axis of rotation of said rotatable means.

References Cited

UNITED STATES PATENTS 3,217,623   11/1965   Hotchkiss _____ 95—12.5

JOHN M. HORAN, *Primary Examiner.*